(12) United States Patent
Pitera et al.

(10) Patent No.: US 10,042,177 B1
(45) Date of Patent: Aug. 7, 2018

(54) GRID-BASED MEASURING AND AIMING RETICLE FOR OPTICAL SIGHT

(71) Applicant: The United States of America as Represented by the Secretary of the Army, Washington, DC (US)

(72) Inventors: Thomas Pitera, Fair Lawn, NJ (US); Joseph Petillo, Kenvil, NJ (US); James Hitscherich, Mount Arlington, NJ (US)

(73) Assignee: The United States of America as Represented by the Secretry of the Army, Washington, DC (US)

( * ) Notice: Subject to any disclaimer, the term of this patent is extended or adjusted under 35 U.S.C. 154(b) by 87 days.

(21) Appl. No.: 15/276,012

(22) Filed: Sep. 26, 2016

Related U.S. Application Data

(60) Provisional application No. 62/233,637, filed on Sep. 28, 2015.

(51) Int. Cl.
*G02B 27/32* (2006.01)
*F41G 1/38* (2006.01)

(52) U.S. Cl.
CPC .............. *G02B 27/32* (2013.01); *F41G 1/38* (2013.01)

(58) Field of Classification Search
CPC .................................. F41G 1/12; G02B 27/32
USPC .......................................................... 33/297
See application file for complete search history.

(56) References Cited

U.S. PATENT DOCUMENTS

| | | | | |
|---|---|---|---|---|
| 3,392,450 A | * | 7/1968 | Herter | F41G 1/38 33/297 |
| 4,912,853 A | * | 4/1990 | McDonnell | F41G 1/12 33/1 B |
| 5,920,995 A | * | 7/1999 | Sammut | F41G 1/38 42/122 |
| 7,958,643 B1 | * | 6/2011 | Wu | G02B 23/14 33/297 |
| 2002/0124452 A1 | * | 9/2002 | Sammut | F41G 1/38 42/122 |
| 2009/0235570 A1 | * | 9/2009 | Sammut | F41G 1/473 42/122 |
| 2017/0102209 A1 | * | 4/2017 | Byars | F41G 1/393 |
| 2017/0123224 A1 | * | 5/2017 | Hamilton | F41G 1/38 |
| 2017/0261737 A1 | * | 9/2017 | Sakamoto | G02B 21/34 |

* cited by examiner

Primary Examiner — G. Bradley Bennett
(74) Attorney, Agent, or Firm — John P. Di Scala

(57) ABSTRACT

An aiming reticle comprising two primary characteristic feature sets consisting of a grid system and auxiliary crosshairs. The grid comprises horizontal crosshairs that are perpendicular to but do not intersect with a primary vertical crosshair. Omission of markings along the primary vertical crosshair and non-intersecting horizontal crosshairs provides improved target visibility along the vicinity of the primary vertical crosshair. The grid horizontal crosshairs are marked with intersecting major stadia lines, preferably at unit spatial intervals. The grid system further comprises self-contained crosses of predetermined size, within the space enclosed by the grid major stadia lines and grid horizontal crosshair separations to provide sub-unit reference in the vertical and horizontal reference.

22 Claims, 5 Drawing Sheets

GRID-BASED MEASURING AND AIMING RETICLE FOR OPTICAL SIGHT

RELATED APPLICATIONS

This application claims the benefit of U.S. provisional application No. 62/233,637 filed Sep. 28, 2015, the contents of which are incorporated herein in its entirety.

FEDERAL RESEARCH STATEMENT

The invention described herein may be manufactured, used, and licensed by or for the U.S. Government for U.S. Government purposes.

BACKGROUND OF INVENTION

Field of the Invention

The present invention relates to optics, and more particularly to optical scopes.

Related Art

Current aiming reticle patterns frequently found in precision rifle scopes and observation spotting scopes issued by the US Army and other services consist of simple intersecting crosshairs with markings consisting of dots or stadia lines at predetermined intervals (e.g. one milliradian of angle in target space). One example of such a reticle configuration would be the "Mil-Dot", which was developed during the Vietnam War for the US Marine Corps (USMC). The USMC used oval dots spaced at 1 milliradian for their adopted "Mil-Dot" reticle pattern. The US Army adopted the pattern with several modifications including the use of round dots and dots spaced at 1 artillery mil ($\frac{1}{6400}$ circle). As of 2014, the "Mil-Dot" reticle is used in the US Army M24 sniper rifle and US Army M107 sniper rifle as well as the US Army M151 spotting scope. Other US Army fielded precision rifles, such as the US Army M110 and US Army M2010 use more advanced reticles.

The "Mil-Dot" reticle at a focal plane of an optical instrument, when mounted on a host weapon, provides an aiming reference at the zero range (position where point-of-aim equals point-of-impact), which would typically be set at the intersection of the vertical and horizontal crosshairs, as well as offset aiming reference points at the discretely marked intervals along the vertical and horizontal axes of the intersecting crosshair pattern. The offset aiming references provide unidirectional aiming holds determined by ballistic computation. Vertical holds allow for aiming at an elevation greater than ballistic zero to compensate for gravitational drop of the bullet; horizontal holds allow for aiming before or ahead of a target to compensate for crosswind and/or target movement. Reticle graduations or markings provide ability to place holds within the limits of the pattern and field of view of the optical sight without mechanically adjusting the alignment of the reticle. The marked crosshair pattern also provides an ability to estimate range based on known target dimensions using the predetermined angular markings in the reticle pattern. Techniques for performing this estimation are well documented in US Army field manuals (e.g. FM 3-22, FM 23-10, and TC 23-14) and other sources.

A series of commercial reticle patterns, such as those developed and marketed by Horus Vision, LLC, address limitations to the simple reticle (e.g. "Mil-Dot" or TMR by Leupold®) used in most current and legacy US Army precision optical sights with use of a characteristic series of secondary crosshairs. These patterns extend the effective coverage area of the pattern along the downward and horizontal directions to allow for corrected aiming references in rifle scopes over a broader range without mechanically adjusting the reticle alignment with respect to the target, thereby disrupting the set origin of the weapon zero. These patterns also provide smaller incremental Markings to provide a higher degree of precision than the military common reticle patterns such as the unitary markings of the "Mil-Dot". Additionally, these patterns provide high density markings in at least two of the four quadrants formed by the primary crosshairs to facilitate simultaneous holds in the vertical and horizontal directions.

Although commercial precision aiming reticles for rifle scopes and spotting scopes have addressed many of the limitations compared to the military common "Mil-Dot" reticle, the patterns can be complex and can obscure valuable clear observation space using features that can be avoided through a more novel approach. Additionally, some new features can be defined to provide integral utility for sensitive two-dimensional aiming or measurement.

In some commercially available aiming reticles, the intervals between markings are caliber specific and different weapon system optics use different reticle patterns. This can, in turn, create issues in training throughout the life cycles of the weapon suite. In addition, when the reticle is designed for a specific caliber, any alteration to the standard ammunition will render part of the reticle useless.

SUMMARY OF INVENTION

The present invention relates to a grid-based aiming reticle.

According to a first aspect of the invention, the grid-based aiming reticle includes a plurality of grid horizontal crosshairs having major stadia lines and a plurality of self-contained crosses of predetermined size. Each of the plurality of self-contained crosses is positioned within a space enclosed by the major stadia lines and the grid horizontal crosshairs.

According to a second aspect of the invention, the grid-based aiming reticle includes a primary vertical crosshair, a plurality of grid horizontal crosshairs, a plurality of self-contained crosses of predetermined size, an auxiliary vertical crosshair and an auxiliary horizontal crosshair. The plurality of grid horizontal crosshairs have major stadia lines and do not intersect the primary vertical crosshair. The plurality of self-contained are positioned within a space enclosed by the major stadia lines and grid horizontal crosshair separations to provide a one-half unit reference in both a vertical and a horizontal direction and a sub-unit reference in the vertical direction. The auxiliary vertical crosshair is offset from an optical axis and the auxiliary horizontal crosshair may be offset from an optical axis.

BRIEF DESCRIPTION OF THE DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

DETAILED DESCRIPTION

The present invention is directed to measuring and aiming reticles for use in optical sights, including direct view optics such as observation spotting telescopes and rifle telescopes as well as digital sighting and display systems. These reticles are located within the field of view of an optical instrument, which is typically circular but may also consist of other geometric bounds.

The optical axis, is the radial or Cartesian center of the field of view; the reticle origin is referenced to this point. The scale and visibility in its entirety of the presented reticles may be different when used in a variable magnification optical instrument. With exception to auxiliary, non-primary, or optional pattern features, the upper half of the field of view remains clear at all times for unrestricted observation. Any of the reticles disclosed here can be coupled with passive color designation to accent functional features, thereby drawing attention to the user and improving response for engagement. Additionally, any of the reticles disclosed here are not limited to any particular fabrication method.

Figure 1:
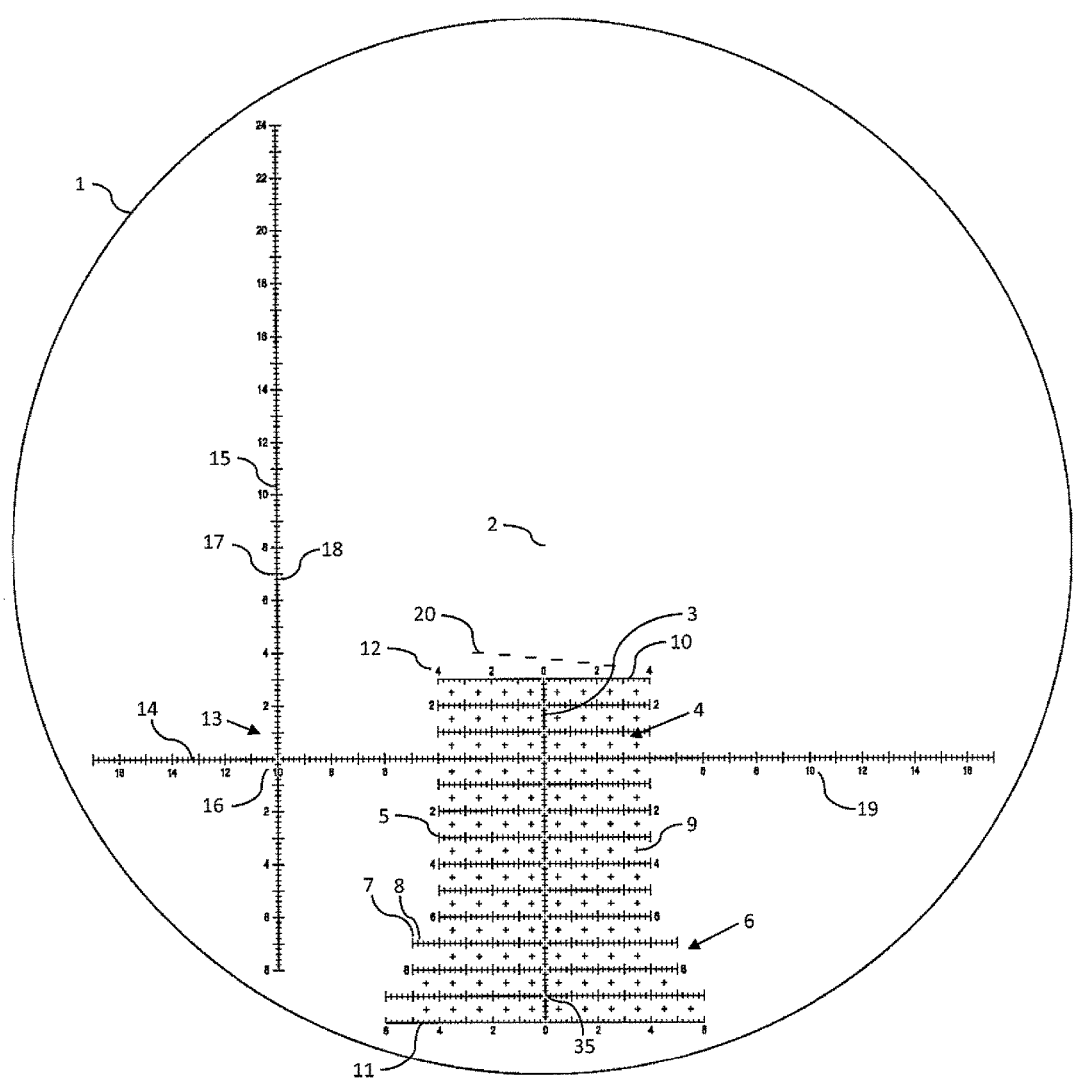
FIG. 1 shows a grid based aiming reticle with self-contained crosses, in accordance with one illustrative embodiment of the invention.

FIG. 1 shows a grid based aiming reticle with self-contained crosses, in accordance with one illustrative embodiment of the invention. These reticles are located within the field of view of an optical instrument 1, which is typically circular but may also consist of other geometric bounds. The optical axis 2 is the radial or Cartesian center of the field of view; the reticle origin is referenced to this point.

In a first embodiment as depicted in FIG. 1, the aiming reticle outlines two primary characteristic feature sets consisting of a grid system 4 and auxiliary crosshairs 13. A primary vertical reference crosshair 3 is placed and aligned to the optical axis; its length is preferably less than the maximum field of view. The primary vertical crosshair 3 provides boresight reference along translation of elevation in the optical instrument and axis of symmetry for the grid system.

The grid is further defined by grid horizontal crosshairs 5 that are perpendicular to but do not intersect with the primary vertical crosshair 3. Omission of markings along the primary vertical crosshair 3 and non-intersecting horizontal crosshairs 5 provides improved target visibility along the vicinity of the primary vertical crosshair 3. Apparent intersection point 35 may be marked with entity consisting of a dot, circle, square block, or other geometric entity. The grid horizontal crosshairs 5 may have symmetrical length extensions 6, at the lower portion of the grid. These length extensions 6 facilitate additional horizontal measurement utility at substantial offset from the vertical target reference in an area that is not otherwise designated for observation or any other predetermined purpose. The grid horizontal crosshairs 5 are marked with intersecting major stadia lines 7, preferably at unit spatial intervals. The grid horizontal crosshairs 5 are also marked with intersecting minor stadia lines 8, preferably at sub-unit spatial intervals.

The grid system further comprises self-contained crosses 9 of predetermined size, within the space enclosed by the grid major stadia lines and grid horizontal crosshair separations. These crosses 9 are centered within the aforementioned features to provide a one-half unit reference in both the vertical and horizontal direction throughout the grid system. Vertical measurement at sub-unit, preferably one-fifth or 0.2 unit, resolution is provided incrementally throughout the grid system using the following feature sequence: base grid horizontal crosshair (0), top of grid major stadia line (0.2), bottom of grid internal cross (0.4), top of grid internal cross (0.6), bottom of next grid major stadia line (0.8), next grid horizontal crosshair (1). Such resolution is provided only along the primary axes in known reticle configurations.

The grid system further comprises optional defined bounds, denoted by half stadia markings at the upper end 10 of the grid and lower end 11 of the grid. The grid system is numerically marked preferably in non-consecutive sequence and non-inclusive of plus or minus sign 12 along the perimeter of the grid. Selective numerical marking reduces target obscuration by removing otherwise easily ascertained scale information.

An auxiliary horizontal reference crosshair 14 intersects the primary vertical reference crosshair 3 preferably at a position offset from the optical axis; the auxiliary horizontal reference crosshair length is preferably less than the maximum field of view. An optional auxiliary vertical reference crosshair 15 intersects the auxiliary horizontal reference crosshair 14 at a position offset from the optical axis; auxiliary vertical reference crosshair length is preferably less than the maximum field of view. A separation in one or both of the auxiliary crosshairs 16, may be made to fit numerical markings.

The auxiliary horizontal reference crosshair 14 and auxiliary vertical reference crosshair 15 are marked with intersecting major stadia lines 17, preferably at unit spatial intervals. The auxiliary horizontal reference crosshair 14 and auxiliary vertical reference crosshair 15 are also marked with intersecting minor stadia lines 18, preferably at sub-unit spatial intervals. Major stadia lines 17 are numerically marked in consecutive or non-consecutive sequence and inclusive or non-inclusive of plus or minus sign 19. Selective numerical marking reduces target obscuration by removing easily ascertained scale information.

The reticle pattern may contain a set of incrementally located range estimation markings 20 that provide clear framing space for a known or assumed target class feature size.

Figure 2:
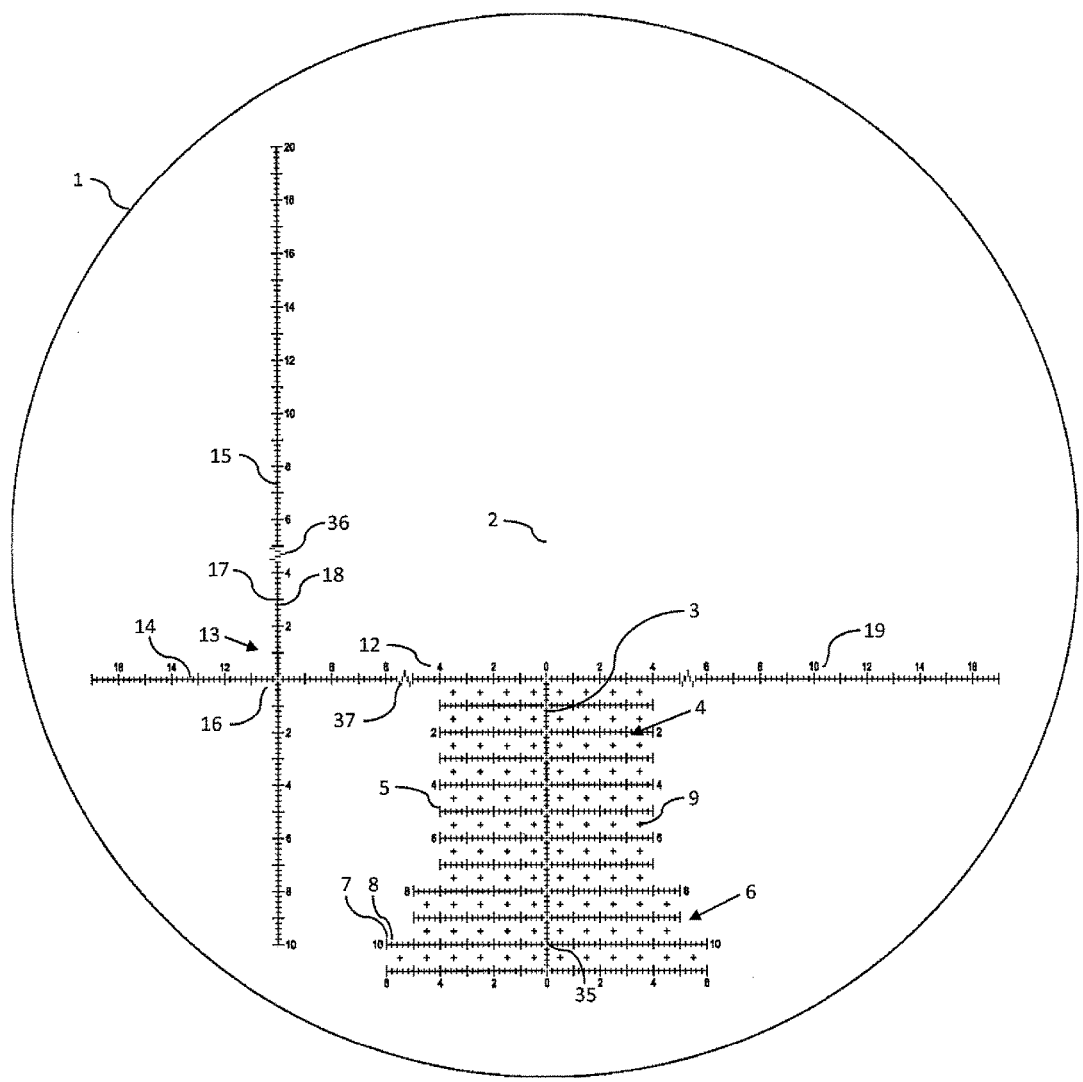
FIG. 2 shows a grid based aiming reticle with self-contained crosses and an auxiliary horizontal crosshair located at the top of the grid, in accordance with one illustrative embodiment of the invention.

FIG. 2 shows a grid based aiming reticle with self-contained crosses and an auxiliary horizontal crosshair located at the top of the grid, in accordance with one illustrative embodiment of the invention. In the alternative embodiment shown in FIG. 2, the auxiliary horizontal crosshair 20 is located at the top of grid, thereby becoming the primary horizontal crosshair. Advantageously, by locating the primary horizontal crosshair at the top of the grid, otherwise unexpected benefits are realized, including: a single concise origin, unobstructed observation of cross range separated or moving targets, and increased utility of auxiliary horizontal crosshair at higher magnification (which reduces field of view).

It was found that some soldiers tended to use the top of grid as origin in measuring point-of-aim versus point-of-impact error regardless of where point-of-impact was made. Therefore, the intersection of the primary vertical and horizontal crosshairs creates a misleading and unused origin location with vertical numbering that does not originate at zero. The horizontal observation space directly above the top of the primary horizontal crosshair is interrupted with the grid system as depicted in FIG. 1. Locating the crosshair at the top of the grid allows a horizontally moving target or two horizontally separated targets to be tracked more easily due to the afforded uncluttered space. The effect of locating the primary horizontal crosshair closer to the optical axis has the effect of allowing more of this crosshair to remain visible as the field of view is reduced from increasing magnification.

Figure 3:
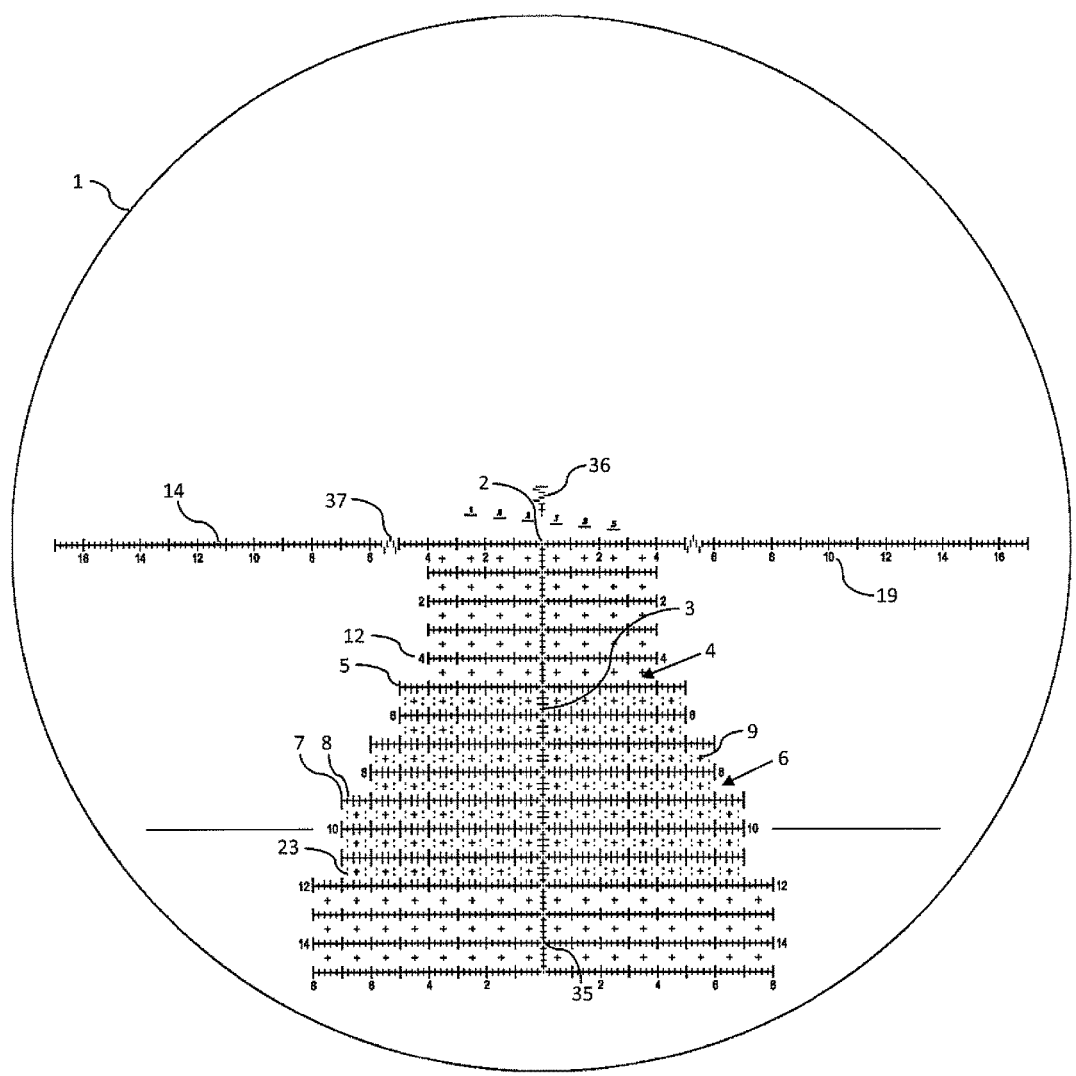
FIG. 3 shows a grid based aiming reticle with self-contained crosses with vertical sub-unit measurement stadia and horizontal sub-unit measurement stadia, in accordance with one illustrative embodiment of the invention.

FIG. 3 shows a grid based aiming reticle with self-contained crosses with vertical sub-unit measurement stadia and horizontal sub-unit measurement stadia, in accordance with one illustrative embodiment of the invention. In the alternative embodiment shown in FIG. 3, the grid system further comprises vertical sub-unit measurement stadia 36 and horizontal sub-unit measurement stadia 37 providing additional precision. In a preferred embodiment, the vertical sub-unit measurement stadia 36 and the horizontal sub-unit measurement stadia 37 are separated by 0.1 milliradian; however, the vertical sub-unit measurement stadia 36 and the horizontal sub-unit measurement stadia 37 are not limited to being separated by 0.1 milliradian. Advantageously, the vertical sub-unit measurement stadia 36 and the horizontal sub-unit measurement stadia 37 are staggered for improved visibility.

Figure 4:
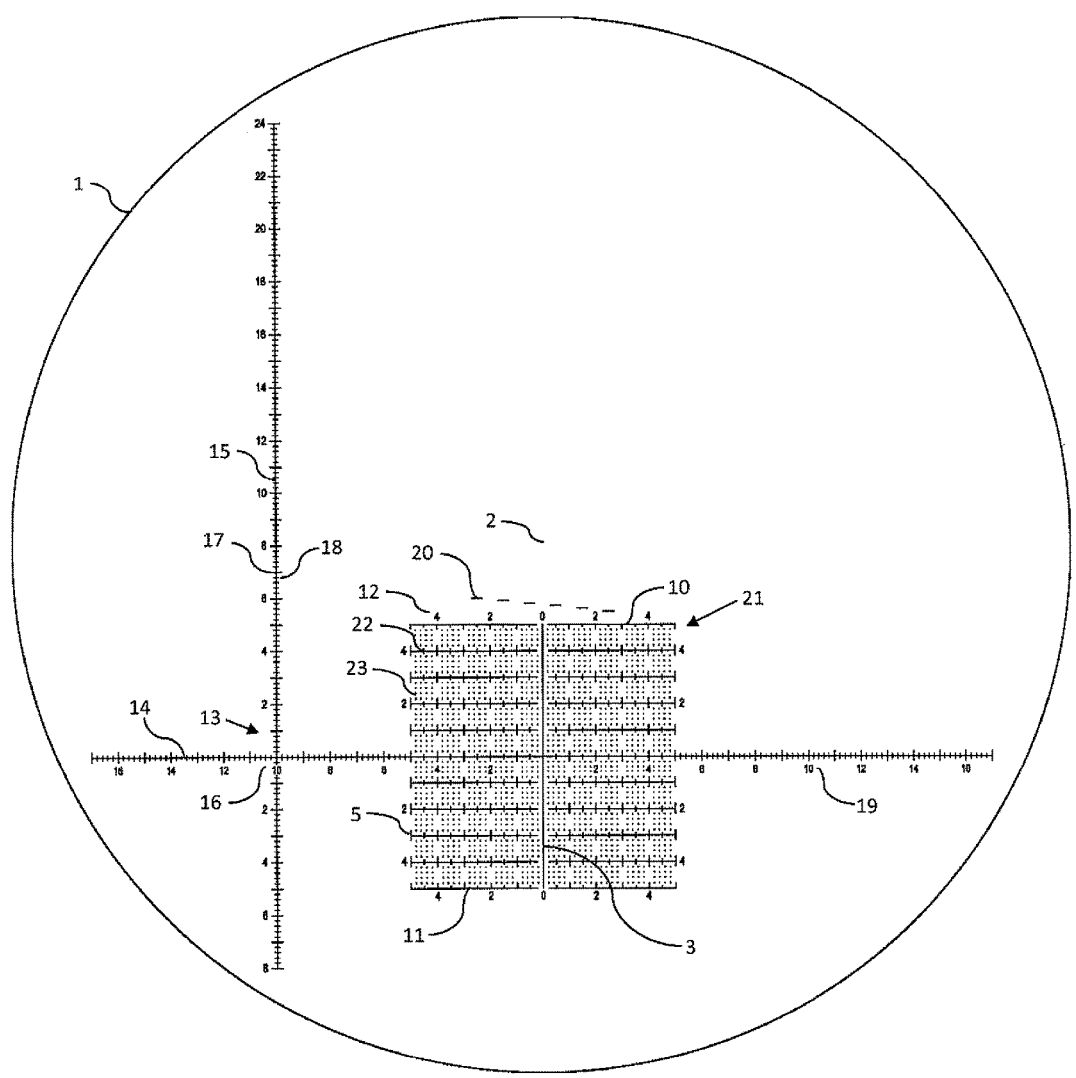
FIG. 4 shows a grid-based aiming reticle having a micro-grid array, in accordance with one illustrative embodiment of the invention.

FIG. 4 shows a grid-based aiming reticle having a micro-grid array, in accordance with one illustrative embodiment of the invention. The embodiment of the grid-based reticle depicted in FIG. 4 outlines an alternate grid system 21. This embodiment may include the auxiliary crosshairs 13 and associated features of the auxiliary crosshairs as described in reference to elements 13-19 of FIG. 1, as well as the range estimation markings 20 as described in reference to FIG. 1.

The alternate grid system 21 comprises grid horizontal crosshairs 5 that are perpendicular to but do not intersect with the primary vertical crosshair 3. The grid system 21 further comprises grid major stadia lines 7, preferably at unit spatial intervals. The grid horizontal crosshairs 5 are marked with intersecting minor stadia lines 22, preferably at one-half unit spatial intervals. The grid system further comprises self-contained micro-grid arrays of dots or blocks 22, within the space enclosed by the grid major stadia lines 7 and grid horizontal crosshair 5 separations. The micro-grid array 22 provides one-tenth or one-fifth unit reference in both the vertical and horizontal direction throughout the grid system.

Figure 5:
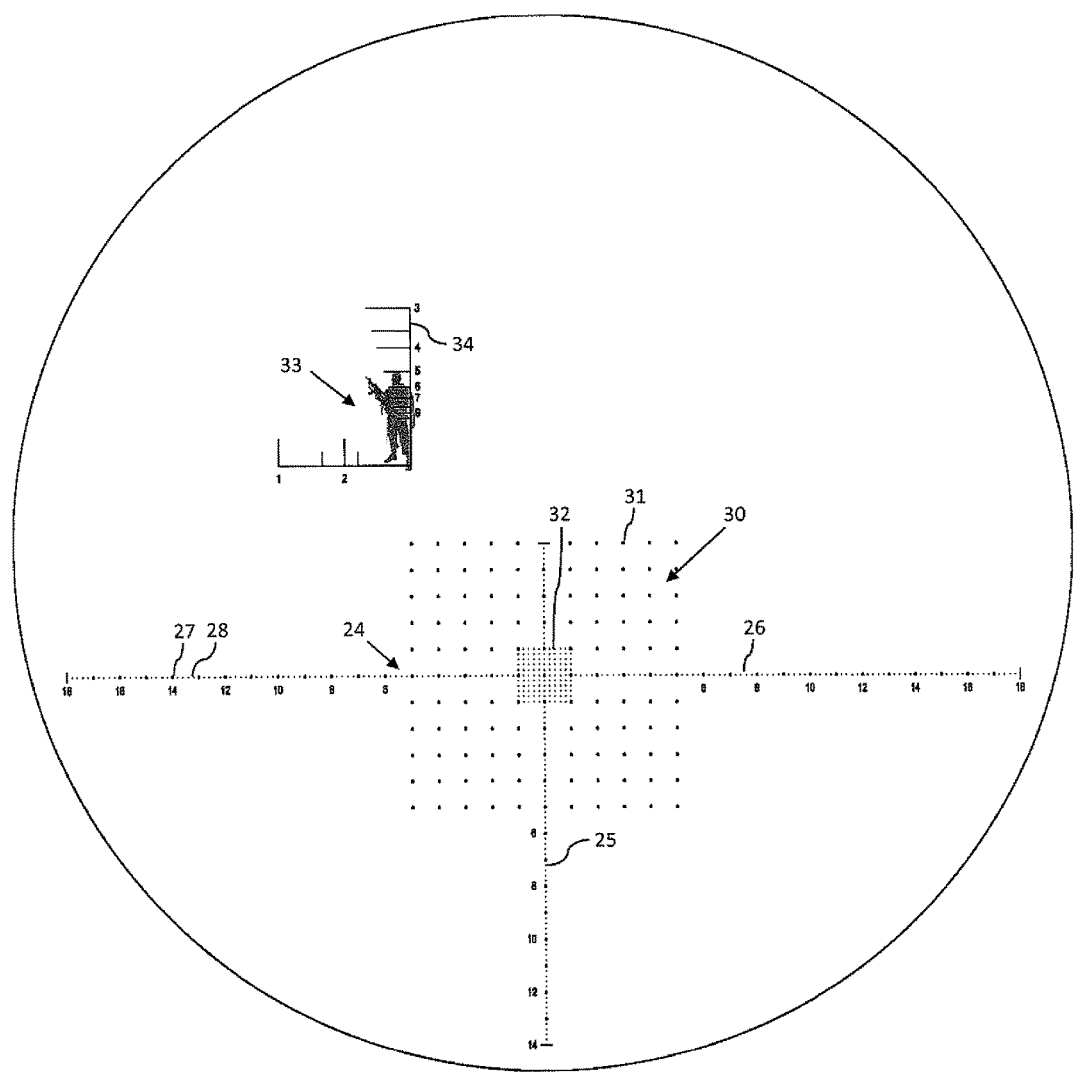
FIG. 5 shows a grid based aiming reticle having apparent crosshairs, a variable density grid system and an alternate range estimation feature, in accordance with one illustrative embodiment of the invention.

FIG. 5 shows a grid based aiming reticle having apparent crosshairs, a variable density grid system and an alternate range estimation feature, in accordance with one illustrative embodiment of the invention. The embodiment of the aiming reticle depicted in FIG. 5 outlines apparent crosshairs formed with a series of symbols 24, a variable density grid system 30 and an alternate range estimation feature 33. The symbols used to form apparent crosshairs 24 may consist of dots, circles, square blocks, or other geometric entities. The common practice is to mark Cartesian coordinates with a crosshair intersected with a stadia lines or dots; however, the use of only high density symbols along an axis provides novel aiming references while effectively become a line. Accordingly, obscuration is reduced without loss of point references.

A primary vertical axis of symbols 25 is placed and aligned horizontally to the optical axis; its length is preferably less than the maximum field of view. The primary vertical axis 25 provides boresight reference along translation of elevation in the optical instrument and mode of symmetry for the variable density grid system 30. A primary horizontal axis of symbols 26 intersects the primary vertical axis 25 of symbols preferably at a position offset from the optical axis; its length is preferably less than the field of view. Major spatial intervals along the primary vertical and horizontal axes are marked with sufficiently larger symbols consisting of dots, circles, or square blocks 27, preferably at unit spatial intervals. Minor spatial intervals along the primary vertical 25 and horizontal axes 26 are marked with sufficiently smaller symbols consisting of dots, circles, or square blocks 28, preferably at sub-unit spatial intervals. Major symbols are numerically marked in consecutive or non-consecutive sequence and inclusive or non-inclusive of plus or minus sign 29.

A variable density grid system 30 is placed at the intersection of the primary vertical axes 25 and primary horizontal axes 26 of symbols. A low density array of symbols, equally spaced vertically and horizontally preferably at unit spatial intervals 31, covers the entire gridspace. A high density array of symbols, equally spaced vertically and horizontally preferably at sub-unit spatial intervals 32 denoting refined aiming and measurement precision is limited to a small central region. Grid patterns used in telescopes used for observation are used to facilitate small angle vertical and horizontal measurements relative between two targets and between a target and projectile point of impact or other reference. An absolute grid pattern stemming from a primary origin, such as the intersection of a horizontal and vertical crosshair, denotes redundant markings that clutter the clear field of view to the user. A reduced region of high density grid, as disclosed here, reduces the clutter by limiting the high resolution increment zone to a smaller region within the reticle pattern. In effect, a target is placed on a major (coarse) marking denoted by the low density grid such that the reference or second target falls within the minor (fine) marking region denoted by the high density grid.

Also featured on the aforementioned are optional markings to estimate distance to a target 33; such markings 33 are located outside the center of the field of view. The ranging estimator is preferably based on an average man sized standing target but can be changed and adjusted to any other known target size. The range estimator consists of two orthogonal lines with numerically marked hash marks 34. The vertical markings indicate the estimated range of the target utilizing head to toe distance. The horizontal markings indicate the estimated range of the target utilizing shoulder to shoulder distance.

We claim:

1. A grid-based aiming reticle comprising a plurality of grid horizontal crosshairs having major stadia lines and a plurality of self-contained crosses of predetermined size, each of the plurality of self-contained crosses positioned within a space enclosed by the major stadia lines and the grid horizontal crosshairs.

2. The grid-based aiming reticle of claim 1 wherein the plurality of self-contained crosses are positioned within the major stadia lines and the grid horizontal crosshairs to provide a one-half unit reference in both a vertical direction and a horizontal direction.

3. The grid-based aiming reticle of claim 1 wherein the major stadia lines and self-contained crosses are sized and positioned to provide a sub-unit reference in a vertical direction.

4. The grid-based aiming reticle of claim 3 wherein the sub-unit reference is a one-fifth sub-unit reference.

5. The grid-based aiming reticle of claim 3 wherein the sub-unit reference is a one-tenth sub-unit reference.

6. The grid-based aiming reticle of claim 1 further comprising a primary vertical crosshair and wherein the plurality of grid horizontal crosshairs do not intersect the primary vertical crosshair.

7. The grid-based aiming reticle of claim 1 further comprising defined bounds denoted by a plurality of half stadia markings at an upper bound and at a lower bound.

8. The grid-based aiming reticle of claim 1 wherein one or more grid horizontal crosshairs located at a bottom portion of the grid further comprise symmetrical length extensions.

9. The grid-based aiming reticle of claim 1 wherein the one or more grid horizontal crosshairs are numerically marked in non-consecutive sequence and non-inclusive of both a positive indicator and a negative indicator.

10. The grid-based aiming reticle of claim 1 wherein the major stadia of at least one of the plurality of grid horizontal crosshairs are numerically marked in non-consecutive sequence and non-inclusive of both a positive indicator and a negative indicator.

11. The grid-based aiming reticle of claim 1 wherein an auxiliary horizontal crosshair is located at a top of the grid defined by the plurality of grid horizontal crosshairs.

12. The grid-based aiming reticle of claim 1 further comprising vertical sub-unit measurement stadia.

13. The grid-based aiming reticle of claim 1 further comprising horizontal sub-unit measurement stadia.

14. A grid-based aiming reticle comprising
a primary vertical crosshair;
a plurality of grid horizontal crosshairs having major stadia lines and wherein each of the plurality of grid horizontal crosshairs do not intersect the primary vertical crosshair;
a plurality of self-contained crosses of predetermined size, each of the plurality of self-contained crosses positioned within a space enclosed by the major stadia lines and grid horizontal crosshair separations to provide a one-half unit reference in both a vertical and a horizontal direction and a sub-unit reference in the vertical direction.

15. The grid-based aiming reticle of claim 14 further comprising an auxiliary vertical crosshair and an auxiliary horizontal crosshair offset from an optical axis.

16. The grid-based aiming reticle of claim 14 wherein the sub-unit reference is a one-fifth sub-unit reference.

17. The grid-based aiming reticle of claim 14 wherein the sub-unit reference is a one-tenth sub-unit reference.

18. The grid-based aiming reticle of claim 14 further comprising defined bounds denoted by a plurality of half stadia markings at an upper bound and at a lower bound.

19. The grid-based aiming reticle of claim 14 wherein one or more grid horizontal crosshairs located at a bottom portion of the grid further comprise symmetrical length extensions.

20. The grid-based aiming reticle of claim 14 wherein an auxiliary horizontal crosshair is located at a top of the grid defined by the plurality of grid horizontal crosshairs.

21. The grid-based aiming reticle of claim 14 wherein the one or more grid horizontal crosshairs are numerically marked in non-consecutive sequence and non-inclusive of both a positive indicator and a negative indicator.

22. The grid-based aiming reticle of claim 14 wherein the major stadia of at least one of the plurality of grid horizontal crosshairs are numerically marked in non-consecutive sequence and non-inclusive of both a positive indicator and a negative indicator.

* * * * *